US012555708B2

(12) United States Patent
Kruska et al.

(10) Patent No.: US 12,555,708 B2
(45) Date of Patent: Feb. 17, 2026

(54) ASSEMBLY COMPRISING A DISCONNECTING DEVICE FOR A SURGE-ARRESTING DEVICE

(71) Applicant: Siemens Energy Global GmbH & Co. KG, Munich (DE)

(72) Inventors: Bernd Kruska, Berlin (DE); Bi Xue Liu, Jiangsu (CN); Arkadz Petchanka, Berlin (DE); Frank Reichert, Weissenfels (DE); Ralf Rössler, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 237 days.

(21) Appl. No.: 18/260,502

(22) PCT Filed: Dec. 10, 2021

(86) PCT No.: PCT/EP2021/085153
§ 371 (c)(1),
(2) Date: Jul. 6, 2023

(87) PCT Pub. No.: WO2022/148599
PCT Pub. Date: Jul. 14, 2022

(65) Prior Publication Data

US 2024/0055161 A1 Feb. 15, 2024

(30) Foreign Application Priority Data

Jan. 6, 2021 (CN) ......................... 202110011479.9

(51) Int. Cl.
*H01C 7/12* (2006.01)
*H01T 1/14* (2006.01)

(52) U.S. Cl.
CPC ............... *H01C 7/126* (2013.01); *H01T 1/14* (2013.01)

(58) Field of Classification Search
CPC ................................. H01C 7/126; H01T 1/14
(Continued)

(56) References Cited

U.S. PATENT DOCUMENTS 5,237,482 A * 8/1993 Osterhout ................. H01T 1/14 361/127
8,106,321 B2 1/2012 Göhler et al.
(Continued)

FOREIGN PATENT DOCUMENTS

CN 101836340 A 9/2010
CN 111052521 A 4/2020
(Continued)

OTHER PUBLICATIONS

Dehn Italia S.p.A., Installation Instruction—Rating Plate, Publication No. 1496/Update 11.10, ID No. 047840, p. 2, Year: 2010, www.dehn.it.

*Primary Examiner* — Yemane Mehari
(74) *Attorney, Agent, or Firm* — Laurence A. Greenberg; Werner H. Stemer; Ralph E. Locher

(57) ABSTRACT

An assembly contains a disconnecting device for a surge-arresting device. A first contact and a second contact of the disconnecting device are connected by a first path having a switching element which can be thermally tripped. A second path is disposed electrically in parallel with the first path. An impedance element is disposed in the second path. A spark gap is disposed in the first path.

17 Claims, 5 Drawing Sheets

(58) Field of Classification Search
USPC .......................................................... 361/56
See application file for complete search history.

(56) References Cited

U.S. PATENT DOCUMENTS

| | | | | |
|---|---|---|---|---|
| 10,014,098 | B2 * | 7/2018 | Hirschmann | H01H 37/76 |
| 11,152,769 | B2 | 10/2021 | Hirschmann et al. | |
| 11,159,013 | B2 | 10/2021 | Li et al. | |
| 2005/0041349 | A1 | 2/2005 | Birkholz et al. | |
| 2011/0032651 | A1 | 2/2011 | Depping et al. | |
| 2011/0211287 | A1 * | 9/2011 | Ehrhardt | H01C 7/12 361/91.1 |
| 2012/0268850 | A1 | 10/2012 | Rainer et al. | |
| 2013/0106567 | A1 | 5/2013 | Depping et al. | |
| 2014/0292472 | A1 * | 10/2014 | Qin | H01H 89/00 337/5 |
| 2015/0103462 | A1 | 4/2015 | Depping | |

FOREIGN PATENT DOCUMENTS

| | | | | |
|---|---|---|---|---|
| DE | 1982492 | U | 4/1968 | |
| DE | 102007012296 | A1 * | 9/2008 | H01H 39/002 |
| DE | 102018215830 | A1 * | 3/2020 | H01C 7/126 |
| DE | 202019103664 | U1 | 10/2020 | |
| GB | 1206506 | A | 9/1970 | |
| WO | WO 2018188897 | A1 | 10/2018 | |

* cited by examiner

ASSEMBLY COMPRISING A DISCONNECTING DEVICE FOR A SURGE-ARRESTING DEVICE

FIELD AND BACKGROUND OF THE INVENTION

The invention relates to an assembly comprising a disconnecting device for a surge-arresting device, having a first contact means and a second contact means, between which a first path, having a switching element which can be thermally tripped, is arranged.

An assembly of this type is known, for example, from international publication WO 2018/188 897. Herein, a disconnection and switch-over device is described, having a "thermal cut-off point". The thermal cut-off point is equipped with a movable conductor element, the function of which is to ensure the execution of an unambiguous switching function, even in the event of insidious heat-up. To this end, it is provided that the movable conductor element arranged therein, employing a wiper or a sliding contact, is movable between three positions.

The employment of three positions is intended to influence the switch-in response of the known assembly in a positive manner. However, an arrangement of this type is cost-intensive, and is classified as structurally cumbersome.

SUMMARY OF THE INVENTION

Accordingly, the object of the invention is the disclosure of a cost-effective assembly which, with compact dimensions, delivers a sufficiently reliable switch-in response.

According to the invention, this object is fulfilled by an assembly of the above-mentioned type, having a second path which is electrically parallel to the first path, comprising an impedance element which is arranged between the first and the second contact means and wherein, in the first path, a spark gap (e.g. a coordinating spark gap) is arranged.

The function of a disconnecting device is the interruption of an electrically conductive connection. A connection of this type can be, for example, a ground connection. Ground connections of this type are employed for the short-term formation of a short-circuit to ground, in order to permit the clearance of voltage surges on electrical energy transmission grids. In order to ensure that a ground connection is only formed in the event of voltage surges which exceed limiting values, "surge-arresting devices" are employed. Surge-arresting devices are employed in a ground connection which is routed from a phase conductor of an electrical energy transmission grid to a ground potential. Surge-arresting devices comprise, for example, a varistor, the impedance response of which varies according to the voltage which is applied thereto. According to the voltage level, varistors have different threshold values, above which they assume a low-resistance response, and below which they assume a high-resistance response.

In order to exclude any permanent maintenance of a ground connection in the event of a malfunction, for example a short-circuit in a varistor, disconnecting devices are employed which, in the event of such a malfunction, interrupt the ground connection. This is generally executed in an irreversible manner, by the destruction of the disconnecting device.

Disconnecting devices generally comprise a first contact means and a second contact means. The function of the contact means is the incorporation of the disconnecting device into a ground-leakage connection. Thus, for example, one contact means can be connected to a surge-arresting device in an electrically conductive manner, whereas the other contact means is connected to a ground potential. In order to permit a response of the disconnecting device in the event of a malfunction, a thermally actuatable switching element is provided. According to the thermal load applied, tripping of the switching element is executed. This means that, in the event of an overshoot of a specified energy input (e.g. of thermal energy), the thermally actuatable switching element is opened (tripped). To this end, the thermally actuatable switching element is arranged in a first path, which is routed between the first contact means and the second contact means. A thermally actuatable switching element can be configured, for example, in the form of a fusible link.

In an electrically parallel arrangement to the first path, advantageously, a second path is provided which, in the manner of the first path, also extends between the first contact means and the second contact means. Within the second path, advantageously, an impedance element is arranged. Advantageously, the impedance element is an ohmic resistor (or, alternatively, can also be a varistor or an ohmic resistor with a parallel-connected capacitor) which has a high resistance rating (for example, of several kilo-ohms, or several tens of kiloohms). To a limited extent, the impedance element permits, by means of the disconnecting device, leakage currents which flow, for example, through a varistor to be diverted to a ground potential. Any leakage current is essentially limited by the impedance of the varistor in a non-conducting state.

By the arrangement of a spark gap (e.g. a coordinating spark gap) in the first path, preferably in series with the thermally actuatable switching element which is located therein, it is possible for leakage currents of this type, which represent a normal operating variable, to be diverted exclusively via the impedance element. The first path remains free of any such current loads. Correspondingly, the thermally actuatable switching element is also exempt from any pre-loading, such that any manifestations of ageing therein or any unwanted pre-tempering etc., is prevented.

Any rise in a leakage current, for example in response to the ageing of an up-circuit surge-arresting device or a short-circuit in a varistor etc., is associated with an increase in the resistance voltage across the impedance element. A rise in the leakage current, and an overshoot of a threshold value which is not acceptable, is described as a fault current. In the event of the occurrence of a fault current, a limiting value for the resistance voltage across the impedance element is achieved. This is described as the achievement of a limiting voltage. An overshoot of the limiting voltage results in the generation of an arc in the spark gap, as a result of which a current also flows in the first path. According to the settings applied for the impedance ratios of the first and second paths, there is a corresponding division of the fault current between the first path and the second path. The fault current is commutated from the second path to the first path. The spark gap is connected in-circuit. The thermally actuatable switching element which is also located in the first path, as a result of the in-circuit connection of the spark gap, is firstly energized with the resulting current in the first path (and the corresponding Joule heat) and, secondly, the switching element is exposed to the thermal energy of the arc. As a result of the current flux in the first path and/or the thermal action of the arc in the spark gap, an input of thermal energy to the disconnecting device occurs, and the thermally actuatable switching element is switched. By means of the spark gap, the thermally actuatable switching element is actuated (tripped). The spark gap and the thermally actuatable switching element are connected in series in the first path. Tripping of the switching element is preferably associated with an expansion of the spark gap. In other words, at least one arcing root point (arcing horn) of the spark gap is displaced in its position (particularly in response to burn-out).

Advantageously, it can further be provided that the thermally actuatable switching element comprises a first switching section and a second switching section, which are mutually connected in an electrically conductive manner via a thermally actuatable rupture joint.

A thermally actuatable switching element is employed for switching in response to a variation in the application of thermal energy. The thermally actuatable switching element can preferably initiate an opening or disconnection in response to an increase in thermal energy. Opening or disconnection is characterized in that impedance in the switching element is increased towards infinity. By the employment of a switching element having a first switching section and a second switching section, it is possible for the switching sections to be moved relative to one another, in order to vary the impedance response of the thermally actuatable switching element. To this end, advantageously, a thermally actuatable rupture joint is arranged between the first switching section and the second switching section. The rupture joint advantageously assumes a lower thermal conductivity than at least one of the switching sections. The rupture joint can be formed in a variety of ways. For example, the first switching section and the second switching section can be constructed separately, and mutually connected to form the rupture joint. A rupture joint can be, for example, an electrically conductive connection between the first switching section and the second switching section. The first switching section and the second switching section, for example, can be mutually connected by means of a materially bonded joint. The two switching sections, for example, can thus be welded or soldered to one another. Additionally, however, further joining methods between the first and second switching sections can also be employed. For example, the first and second switching sections can be mutually connected in an interference-fitted or form-fitted arrangement, etc. However, a thermally actuatable rupture joint of this type can also be formed, for example, by a material weakening thereof vis-à-vis the switching sections (particularly by means of a reduced cross-section).

In a preferred variant, the first switching section and the second switching section are materially bonded by means of an electrically conductive solder. A planar mutual overlap of the switching sections is preferred for this purpose, with the advantageous interposition of solder. In particular, the thermally actuatable rupture joint can be arranged in the vicinity of the spark gap. Particularly advantageously, it can be provided that, in the vicinity of the thermally actuatable rupture joint, an arcing root point of the spark gap is arranged, at least temporarily. This provides an advantage, in that thermal energy which is discharged by an arc in the spark gap can act on the thermally actuatable rupture joint in a comparatively direct manner.

Advantageously, it can be further provided that, for the application of a pre-tensioning force, a spring element is employed, which compresses the second switching section against the second contact means.

A pre-tensioning force can be employed for the application of mechanical tension to the thermally actuatable rupture joint such that the latter, for example, is fixed in its location. The mode of operation of the thermally actuatable rupture joint is thus ensured, by means of this fixed location. For example, by means of the pre-tensioning force of the spring element, an electrical contact-connection, for example of a sliding contact assembly, can also be ensured. Moreover, it is also possible for the pre-tensioning force of the spring element to generate a relative movement of the switching sections of the thermally actuatable switching element, which are movable relatively to one another. The spring element is thus a drive device for the relative movement of the switching sections of the thermally actuatable switching element.

Between the second contact means and the second switching section, by means of the pre-tensioning force of the spring element, a secure (sliding) electrical contact-connection can be established between the second switching section and the second contact means. Contact-connection of the second switching section and the second contact means can preferably be provided in a region in which the second contact means, at least intermittently, provides an arcing root point for a spark gap. Where the spring element is employed as a drive element for the relative mutual movement of the switching sections, the spring element can preferably generate an essentially linear relative mobility or motion between the two switching sections. This permits the provision of a narrow or structurally compact disconnecting device.

Advantageously, it can further be provided that the pre-tensioning force acts on at least one switching section in an essentially parallel direction to an axis which runs from the first contact means to the second contact means.

The pre-tensioning force can essentially act on at least one of the switching sections, such that a linear motion, relative to the other switching section, is executed further to the tripping of the thermally actuatable switching element. The axis preferably runs through the contact surfaces of the first and second contact means, which are employed for electrical contact-connection in a ground connection. The pre-tensioning force can also be transmitted via a rupture joint of the thermally actuatable switching element. A tensile force can preferably be applied between one switching section and the second contact means. The second contact means can be employed as a stationary abutment for the take-up of forces generated by the spring element. Conversely, the drivable switching section, via the rupture joint of the thermally actuatable switching element, can transmit a force such that, in the non-tripped state of the thermally actuatable switching element, a flow of force continues to be executed via the rupture joint. Accordingly, by means of the rupture joint, an attachment, particularly of the first switching section (by a primary engagement of the pre-tensioning force of the spring element with the second switching section), can also be provided. For example, the first switching section can be braced against a projection in a spring-loaded arrangement.

Advantageously, it can further be provided that the first switching section is compressed by the spring element against the first contact means, with the interposition of an insulating section.

The first contact means, for the assumption of a contact-connection function, has electrically conductive properties. In an analogous manner, the second contact means is also provided with electrically conductive properties, in order to permit the assumption of a contact-connection function by the latter. Bracing of the first switching section, with the interposition of an insulating layer, permits the first switching section to be braced against the first contact means in an electrically insulated manner, and to be secured accordingly. It is thus possible, for example, that respective shoulders on the first switching section and on the first contact means mutually engage from the rear, wherein an insulating section is interposed in the press-contact region. It is thus possible, particularly between the first switching section and the first contact means, at least intermittently, for at least one section of the spark gap to be formed, and for the first switching section to be arranged vis-à-vis the first contact means in an electrically insulated manner.

Moreover, it can advantageously be provided that the assembly comprises a housing having a first housing section and a second housing section, in which the first contact means, the second contact means and the switching element are accommodated, wherein a joint axis between the first housing section and the second housing section is essentially oriented transversely to an axis running from the first contact means to the second contact means.

By means of a housing, the disconnecting device can be protected against external influences. The housing can be employed for the positioning of individual components of the disconnecting device relative to one another. Thus, for example, receiving areas can be provided in the housing, which are employed for the shape-matched positioning, for example, of the first contact means, the second contact means, the thermally actuatable switching element, the impedance means, the spark gap, etc. The housing can be employed as a frame of the disconnecting device. Moreover, the housing can also be configured such that, upon the tripping of the thermally actuatable switching element, a relative movement is initiated, or a deformation, a positively-driven operation, a displacement etc., at least of parts of the switching element within the housing, is executed. A positive tripping of the thermally actuatable switching element can be supported accordingly.

By means of the two housing sections, an option is provided for the simple assembly of the housing and the positioning, for example, of the contact means, the switching element, the impedance element, etc. The housing sections, for example, can essentially be configured in the form of half-shells. In its interior, the housing can delimit an interior space, within which individual components of the disconnecting device can be arranged. However, the housing sections can comprise corresponding receiving areas (e.g. recesses, shoulders, projections, etc.), in which components of the disconnecting device can be inserted.

A joint axis between the housing sections is preferably arranged in an essentially parallel orientation to an axis which runs from the first contact means to the second contact means. An option is thus provided, within the housing or on the housing sections, for the arrangement of receiving areas or abutments for components which are moveable relative to one another such that, in the event of the loading thereof, any overloading of the joint between the housing sections is prevented to the greatest possible extent. For example, it can be provided that, on the thermally actuatable switching element, switching sections which are moveable relative to one another are arranged which, in the event of tripping, are moved apart from one another. This movement can preferably be a linear relative motion between the switching sections. Preferably, the axis of this linear motion is oriented essentially transversely to the joint axis between the first housing section and the second housing section. This permits, for example, guide tracks to be provided, which are not routed across a joint between the housing sections. Advantageously, a relative motion between the switching sections is essentially oriented parallel to an axis between the first and second contact means.

According to a further advantageous configuration, it can be provided that the housing is enclosed by a jacket, which secures the first and the second housing section relative to one another.

The housing can be enclosed by a jacket. The jacket can, for example, secure a first housing section relative to a second housing section. The housing sections, for example, in combination, can form a cylindrical shell surface, which is surrounded by the jacket. A joint axis between the first housing section and the second housing section can preferably be oriented transversely to a cylinder axis of the cylindrical shell surface. By means of the surrounding jacket, any radial spacing of the housing sections from one another can be prevented. Preferably, each of the half-shells can be configured in the form of a half-shell which, in combination, form an essentially cylindrical shell surface and are enclosed by the jacket. The jacket can be, for example, configured in the form of a bushing which, on the shell side, at least in sections, entirely encloses the housing. A joint gap is thus formed between the housing and the jacket.

According to a further advantageous configuration, it can be provided that the jacket surrounds the housing in the manner of a bushing, wherein a first bushing section is connected to a second bushing section in a plug-in arrangement.

By the configuration of the jacket in the form of a bushing, joints between the housing sections of the housing can be covered. Joints are thus protected against the penetration of particles. Advantageously, the bushing can entirely enclose the housing on the shell side, and can also execute a closure of the housing at the end face thereof. At the end face, corresponding electrically conductive through-connections can be provided in the jacket, such that electrical contact-connection is permitted through the jacket. Advantageously, it can be provided that the jacket comprises a first and a second bushing section, which can be connected in a plug-in arrangement. The plug-in connection can preferably be configured in an annular arrangement, such that a circumferential shell-side joint gap is provided in the jacket. The joint gap between the bushing sections can be sealed, for example, by means of a sealing element. Moreover, the bushing sections can be mutually connected in a form-fitted manner and/or secured accordingly in an axial and radial direction. In addition to securing the position of the bushing sections relative to one another, a press-fit arrangement, for example of through-connections, can also permit the electrical contact-connection of contact means of the disconnecting device which are located in the housing. For example, one of the contact means can be configured with elastic resilience, such the bushing sections exert a compressive force upon the through-connections, and electrical contact-connection is ensured accordingly.

The bushing sections can be mutually connected in a manner wherein they are secured against rotation. To this end, security against rotation can be provided by corresponding latching lugs. Moreover, further tongue-and-groove structures can also be provided between the bushing sections.

According to a further advantageous configuration, it can be provided that an interior space which is delimited by the housing is connected by means of least one channel to a joint gap which is located between the housing and the jacket.

The housing encloses an interior space which is employed, for example, for the accommodation of the impedance element, the contact means and the spark gap of the thermally actuatable switching element. Within the housing, i.e. in the interior space, in particular, arrangements for the positioning of the spark gap can also be provided. The occurrence of an arc within the spark gap can result in the expansion of gases. These gases are displaced, for example, in combination with combustion products of the housing or of units which are arranged within the housing. A through-duct penetrates, for example, a wall which delimits the interior space of the housing, and connects the interior space with the surrounding environment. The surrounding environment of the housing can comprise, for example, a joint gap which is formed by means of a jacket. Preferably, a plurality of ducts at the periphery of the housing can also be configured in a distributed arrangement, such that a plurality of ducts terminate in a joint gap between the housing and the jacket. In the event of an overpressure (triggered, for example, by an arc), said overpressure in the interior space can be relieved via the duct into the joint gap. This overpressure can be employed to the effect that, in the event of an intentional distancing of the jacket from the housing (e.g. associated with the driving apart of the bushing sections), the joint gap is widened. This permits a simpler detachment of the housing and the jacket.

Moreover, it can advantageously be provided that the first bushing section comprises an electrically conductive through-connection, which is connected to the first contact means in an electrically conductive manner, and that the second bushing section comprises an electrically conductive through-connection, which is connected to the second contact means in an electrically conductive manner.

The use of a bushing section, and the employment of an electrically conductive through-connection on the respective bushing section permits an electrical potential to be conducted through the bushing section into the interior, preferably to one of the contact means of the disconnecting device. The bushing section and the electrically conductive through-connection can be mutually connected in an angularly rigid manner. Each of the contact means can preferably be connected to one through-connection in an electrically conductive manner, such that the respective contact means are contact-connected through a bushing section of the jacket in a mutually independent manner. Preferably, for the employment of a jacket with a respective bushing section, elastically deformable elements can be provided within the bushing section which are formed, for example, by a corresponding shaping of one of the contact means. The through-connections can be respectively arranged at opposing ends of the jacket or the housing, and are preferably oriented in mutual coaxial opposition. In the configuration of an essentially cylindrical housing or jacket, each of the electrically conductive through-connections should be arranged on mutually averted end faces. As through-connections, for example, threaded bolts are conceivable via which, by means of nuts/threaded bores, electrical contact-connection can be established.

According to a further advantageous configuration, it can be provided that the first switching section assumes a greater wall thickness than the second switching section.

A thermally actuatable switching element can comprise a first and a second switching section. The two switching sections can be mutually connected by means of a rupture joint, wherein a relative movement between the two switching sections can be executed in conjunction with a tripping of the thermally actuatable switching element. The employment of switching sections having different wall thicknesses permits the response characteristic of the thermally actuatable switching element to be adjusted. By means of the wall thickness, the heat intake or heat output of the first switching section can be varied. Preferably, the first switching section can be configured as a stationary switching section. The second switching section can be configured as a movable switching section. Preferably, the relative movement between the switching sections can be a linear movement.

It can further be advantageously provided that the first switching section assumes a greater width than the second switching section.

An enlarged width of the first switching section in relation to the second switching section permits the first switching section to be held at its enlarged region(s), and secured in position. In particular, upon the insertion of the first switching section into the housing (which, in particular, is comprised of a plurality of housing sections), the enlarged regions of the switching section can be positioned by the engagement thereof with shoulders, as a result of which any departure of the first switching station from its stationary position is hindered.

It can further be advantageously provided that the second switching section comprises a crumple zone, particularly in the form of a perforated zone.

The provision of a crumple zone in the switching section, in the event of a relative movement of the switching sections towards one another, permits a deformation of the second switching section. This permits a space-saving structure of the disconnecting device. Thus, for example, the second switching section can be driven by a spring-loaded device which, for example, in the resting state, already applies a pre-tensioning force thereto, to a switch-off position wherein, for example, a fold or a roll-up area undergoes deformation. A compact housing structure can be employed accordingly.

Advantageously, it can further be provided the second contact means comprises an arcing root point.

The second contact means can comprise an arcing root point (arcing horn), for example in order to delimit the spark gap. In conjunction with the actuation of the thermally actuatable switching device, an expansion of the spark gap can occur wherein, for example, the position of the thermally actuatable switching element is altered as a result of a relative movement, or the spark gap is extended in response to the breakup thereof. The spark gap, in the non-tripped state, for example, can particularly be configured between an arcing root point on the first contact means and the thermally actuatable switching element, particularly on the first switching section thereof. The spark gap, in the non-tripped state of the switching device, can assume a dimension of a few millimeters, in order to maintain any arc which may be ignited in proximity to the region of the thermally actuatable switching element. Further to the tripping of the thermally actuatable switching element, the second contact means can provide an arcing root point. Thus, between the first contact means and the second contact means, over a substantially greater distance than a few millimeters (e.g. several tens of millimeters), the spark gap can be expanded in the event of a burning arc. Preferably, the arcing root point of the second contact means can be employed for the sliding contact connection thereof with one of the switching sections, particularly the second switching section, in order to generate a contact force between the second contact means and the second switching section. To this end, a spring-loaded device acting on the second switching section can be employed. This spring-loaded device can be pivoted, for example, about a knee joint. The knee joint can be formed by the second contact means, particularly by an arcing root point. Here, by the interposition of the second switching section, an electrically conductive sliding connection is formed.

According to a further advantageous configuration, it can be provided that the first contact means is connected to a surge-arresting device in an electrically conductive manner and, in particular, is carried by the latter, or that the second contact means is connected to a surge-arresting device in an electrically conductive manner and, in particular, is carried by the latter.

A surge-arresting device comprises a variable voltage-dependent impedance element, described as a varistor. The impedance response of the varistor varies in response to an overshoot or undershoot of a threshold voltage value (limit or limiting value). Below a threshold value, the impedance response tends towards infinity. Above a threshold value, the impedance of the varistor reduces towards zero. On the grounds of actual conditions, however, the impedance response below a threshold value is not infinite, but characteristically assumes a finite high-resistance, as a result of which a leakage current occurs.

The first contact means, particularly by the employment of a through-connection, can be connected to the surge-arresting device in an electrically conductive manner. A through-connection can thus be configured, for example, in the form of a threaded bolt, which engages in a diametrically opposed fitting of the surge-arresting device, and is secured therein in an angularly rigid manner. By means of the corresponding through-connection, the disconnecting device can be connected to the surge-arresting device in an angularly rigid manner. The surge-arresting device can mechanically retain the disconnecting device by means of the units which are provided for electrical contact-connection. It can further be provided that the second contact means is connected to the surge-arresting device in an electrically conductive manner. With respect to the configuration and connection of the first contact means to a surge-arresting device, the same terms also apply to the employment of the second contact means for connection to a surge-arresting device.

It can further be advantageously provided that the second contact means is energized with a ground potential, or that the first contact means is energized with a ground potential.

In order to incorporate the surge-arresting device into a ground connection, the surge-arresting device is connected at one end to a phase conductor which is to be protected. The phase conductor which is to be protected, for example, can carry a high voltage. In order to permit the energization of the surge-arresting device with a ground potential at its other end, interposition of the disconnecting device can be arranged. In order to execute potential energization, a ground potential can be applied to the second contact means. To this end, for example, a through-connection in the form of a threaded bolt can be employed to which, for example, an overhead ground wire is connected by means of a screw connection. Alternatively, however, it can also be provided that the first contact means is energized with a ground potential. Corresponding terms apply, in an analogous manner, to the second contact means and the energization thereof with a ground potential.

An exemplary embodiment of the invention is schematically represented hereinafter in a drawing, and is described thereafter in greater detail.

DETAILED DESCRIPTION OF THE INVENTION

Figure 1:
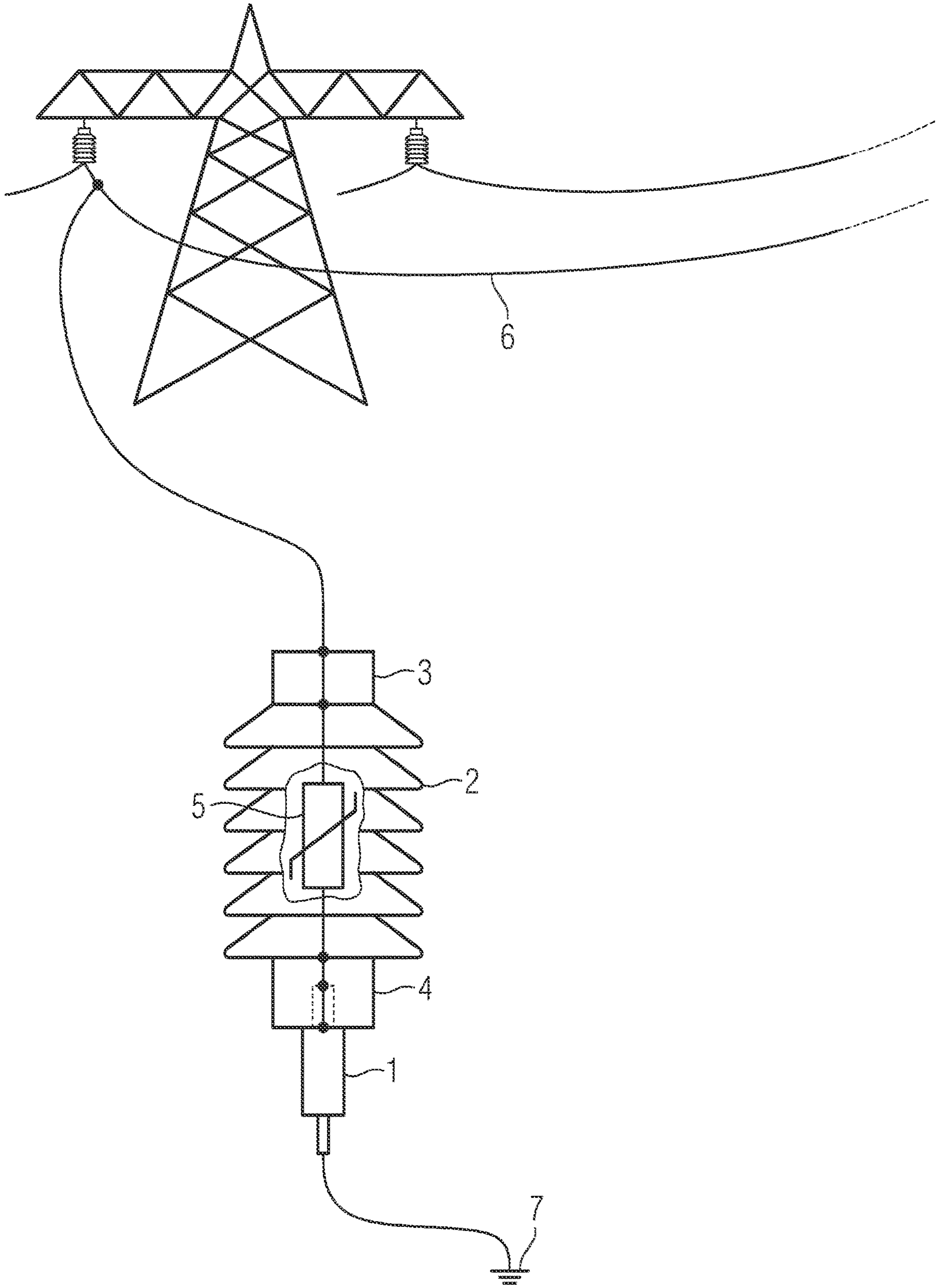
FIG. 1 shows a disconnecting device for a surge-arresting device, in an installed state.

FIG. 1 shows an assembly comprising a disconnecting device 1. The disconnecting device 1 is connected to a surge-arresting device 2 in an angularly rigid manner. The surge-arresting device 2 comprises a first mounting body 3 and a second mounting body 4. The two mounting bodies 3, 4 are separated by an electrically insulating shell, having a shielding for protection against climatic influences. A varistor 5 is arranged within the electrically insulating shell. The varistor 5, for example, is of sintered zinc oxide construction. Within the shell, the varistor 5 is connected at one end to the first mounting body 3, and at the other end to the second mounting body 4, in an electrically conductive contact-connected manner.

The disconnecting device 1 is arranged on the second mounting body 4 in an angularly rigid manner. An electrical contact-connection of the disconnecting device 1 is also executed by means of the second mounting body 4. The surge-arresting device 2 and the disconnecting device 1 are elements of a ground connection, which extends from a phase conductor 6 of an electrical energy transmission installation to a ground potential 7. In the present case, the electrical energy transmission installation is an "overhead line", the phase conductor 6 of which is to be protected against voltage surges. Voltage surges of this type can be caused, for example, by lightning stroke. Voltage surges of this type can be cleared by means of a current flux via the ground connection. In order to prevent any ground leakage via the ground connection during routine operation, the surge-arresting device 2 is arranged in the path of the ground connection. Depending upon the voltage differential which is present between the phase conductor 6 and the ground potential 7, the varistor 5 of the surge-arresting device 2 varies its impedance. During routine operation, the impedance of the varistor 5 tends towards infinity. In the event of an overshoot of threshold value (limit, or limiting value) for the voltage differential, the impedance of the varistor 5 moves towards zero. This results in a switch-through of the ground connection. A voltage surge on the phase conductor 6 can be cleared by a current flux. Once the voltage surge is successfully cleared, the voltage differential between the phase conductor 6 and the ground potential 7 reduces. The varistor 5 can then resume a high-resistance characteristic.

In case of a fault, for example in the event of flashover on the varistor 5, there is a risk of a permanent connection of the phase conductor 6 to the ground potential 7. This would constitute an unacceptable ground leakage in the electrical energy transmission installation. In order to counteract this, the disconnecting device 1 is incorporated in the ground connection. The disconnecting device 1 interrupts the ground connection permanently, e.g. by the destruction of the disconnecting device 1.

The operating principle of the disconnecting device 1 is described hereinafter, with reference to FIGS. 2, 3 and 4, in which elements of the disconnecting device 1 are represented. The disconnecting device 1 comprises a first contact means 8, a second contact means 9, an impedance element 10, a spark gap 11, and a thermally actuatable switching element 12. The thermally actuatable switching element 12 comprises a first switching section 13 and a second switching section 14, which are connected by means of a thermally actuatable rupture joint 15. The first switching section 13 and the second switching section 14 are configured in the form of strips, wherein the strips are mutually overlapping. For the mutual connection of the first switching section 13 and the second switching section 14, the thermally actuatable rupture joint 15 is formed by "soldering", by way of a materially bonded joining method. The thermally actuatable rupture joint 15 connects the first switching section 13 and the second switching section 10 both mechanically and in an electrically conductive manner. In the event of a sufficient energy input (in thermal form) to the thermally actuatable rupture joint 15, the thermally actuatable rupture joint 15 is tripped, and the two switching sections 13, 14 are mutually detached.

The first contact means 8 and the second contact means 9 are initially arranged in a stationary manner in relation to one another, and are connected by means of the rupture joint 15. The two contact means 8, 9 are secured by means of an electrically insulating structure (e.g. a housing). The varistor 5 is connected to the first contact means 8 in an electrically conductive manner. Originating from the first contact means 8, a first path 16 extends from the first contact means 8 via the spark gap 11 to the thermally actuatable switching element 12, and from thence to the second contact means 9. A second path 17 is provided, in a parallel arrangement hereto. The second path 17 extends from the first contact means 8 via the impedance element 10 to the second contact means 9. In order to position the impedance element 10 between the first contact means 8 and the second contact means 9, a compression spring is provided, which engages with the second contact means 9, executes an electrical contact-connection function at this point, and compresses the impedance element 10 against the first contact means 8. The first path 16 and the second path 17 are thus configured in an electrically parallel arrangement between the first contact means 8 and the second contact means 9. The first contact means 8 provides a first arcing root point 18 (arcing horn). The second contact means 9 provides a second arcing root point 19 (arcing horn). The second arcing root point 19 is configured in the form of a projecting knee joint. At the second arcing root point 19, the second switching section 14 engages in a sliding contact arrangement. On the grounds of the shape of the second arcing root point 19, the second switching section 14, which engages therewith, undergoes a preferably elastic strain. By means of a spring element 20, a tensile force is applied to the second switching section 14. The second switching means 14, in response to the tensile force applied by the spring element 20, is thus drawn in the direction of the second contact means 9. On the grounds of the stationary positioning of the first contact means 8, the second contact means 9, and the connection thereof via the thermally actuatable rupture joint 15, is secured in its position. The thermally actuatable switching element 12 is subject to a mechanical pre-tensioning force. In order to support the strain of the second switching section 14, the latter comprises a crumple zone 21. This crumple zone 21 is produced, for example, by way of a material weakening. This material weakening can be executed, for example, by means of recesses in the second contact means 9.

A tongue is arranged on the second contact means 9. The tongue is formed, for example, by the bending of a section of the second contact means 9. The tongue forms a counter-bearing for the spring-loaded compression of the impedance element 10 against the first contact means 8. By means of the tongue and the compression spring employed, an electrical contact-connection of the impedance element 10 with the second contact means 9 is executed. By means of the compression force applied to the impedance element 10, the latter is compressed against the first contact means 8. A second path 17 is thus formed between the first contact means 8 and the second contact means 9.

The operating principle of an assembly comprising a disconnecting device 1 for a surge-arresting device 2 is described hereinafter with reference to the sequence of representations according to FIGS. 2, 3 and 4. In routine operation (with the varistor 5 undisturbed, and no voltage surge on the phase conductor 6), the varistor 5 assumes a high-resistance characteristic. Via the varistor 5, driven by an electric voltage on the phase conductor 6, a leakage current flows to the ground potential 7. The leakage current thus flows via the disconnecting device 1. On the grounds of the high impedance of the spark gap 11 in the first path 16, the leakage current flows to ground potential 7, almost in its entirety, via the second path 17, and the impedance element 10, from the first contact means 8 to the second contact means 9. In the event of the occurrence of a voltage surge on the phase conductor 6, the impedance characteristic of the varistor 5 alters towards zero. A discharge current, which is driven by the voltage surge on the phase conductor 6, is conducted via the now low-resistance varistor 5 and the first contact means 8, and on the second path 17 via the second contact means 9 to the ground potential. The voltage surge is thus discharged below a threshold value, and the varistor 5 resumes an impedance characteristic which tends towards infinity. A leakage current is again conducted via the impedance element 10 to the ground potential 7.

A continuously sustained voltage surge on the phase conductor 6, and the resulting apprehension of overheating, or a fault in the varistor 5 can result in the occurrence of a continuously sustained discharge current or a very high discharge current from the phase conductor 6 to the ground potential 7. A rise in the discharge current, which initially flows via the impedance element 10, is also associated with an increase in the voltage drop across the impedance element 10. In the event of an overshoot of a limiting voltage for the voltage drop across the impedance element 10, flashover will occur on the spark gap 11. The response behavior of the spark gap 11 can be determined by the dimension of the spark gap 11. Flashover on the spark gap 11 will result in the ignition of an arc in the spark gap 11. In addition to the electric current flowing via the arc, which also flows via the thermally actuatable switching element 12 and the second contact means to the ground potential 7, the thermally actuatable switching element 11 also undergoes heat-up by the arc. As a result of this thermal input, the thermally actuatable rupture joint 15 is weakened, and ultimately tripped. In response to the pre-tensioning force exerted on the second switching section 14 of the thermally actuatable switching element 12 by the spring element 11, a mutual distancing of the two switching sections 13, 14 occurs. As a result, the distance across the spark gap 11 is enlarged, and the arc is extended. As a result, additionally, thermal energy which is introduced into the disconnecting device 1 is increased (see FIG. 3). As the relative movement of the two switching sections 13, 14 in relation to one another progresses, the second switching section 14 is further removed from the first switching section 13, and is drawn via the second arcing root point 19 towards the second contact means 9. As a result of the provision of a crumple zone 21, strain of the second switching section 14 occurs, and a positioning thereof in the region of the second contact means 9.

Figure 4:
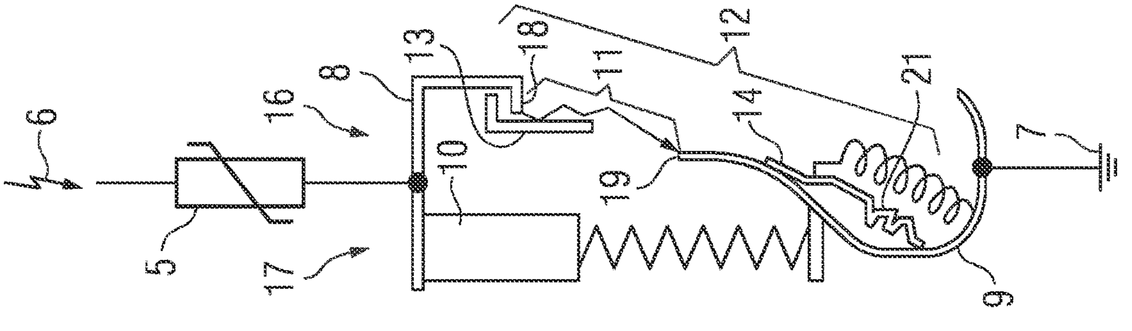
FIG. 4 shows elements of the disconnecting device in a tripped state.

A further enlargement of the span of the spark gap 11 is thus provided, such that the ignited arc is further expanded (see FIG. 4). The ignited arc introduces further heat into the disconnecting device 1, and results in an expansion of gases. These gases can originate, for example, from the combustion of plastic material. Expanding gases can result in the pressure loading of the disconnecting device 1, as a result of which the latter can be destroyed. The thermal energy of the arc is employed, for example, to execute an irreversible destruction of the disconnecting device 1. In order to support the application of a pressure load, the disconnecting device 1 comprises, for example, a housing (not represented in FIGS. 2, 3 and 4) which, on the grounds of the rising pressure in its interior, is destroyed. In consequence, the disconnecting device 1 is also destroyed. A break is thus introduced in the ground connection between the phase conductor 6 and the ground potential 7. As a result of this break, an unwanted discharge current is interrupted.

Figure 5:
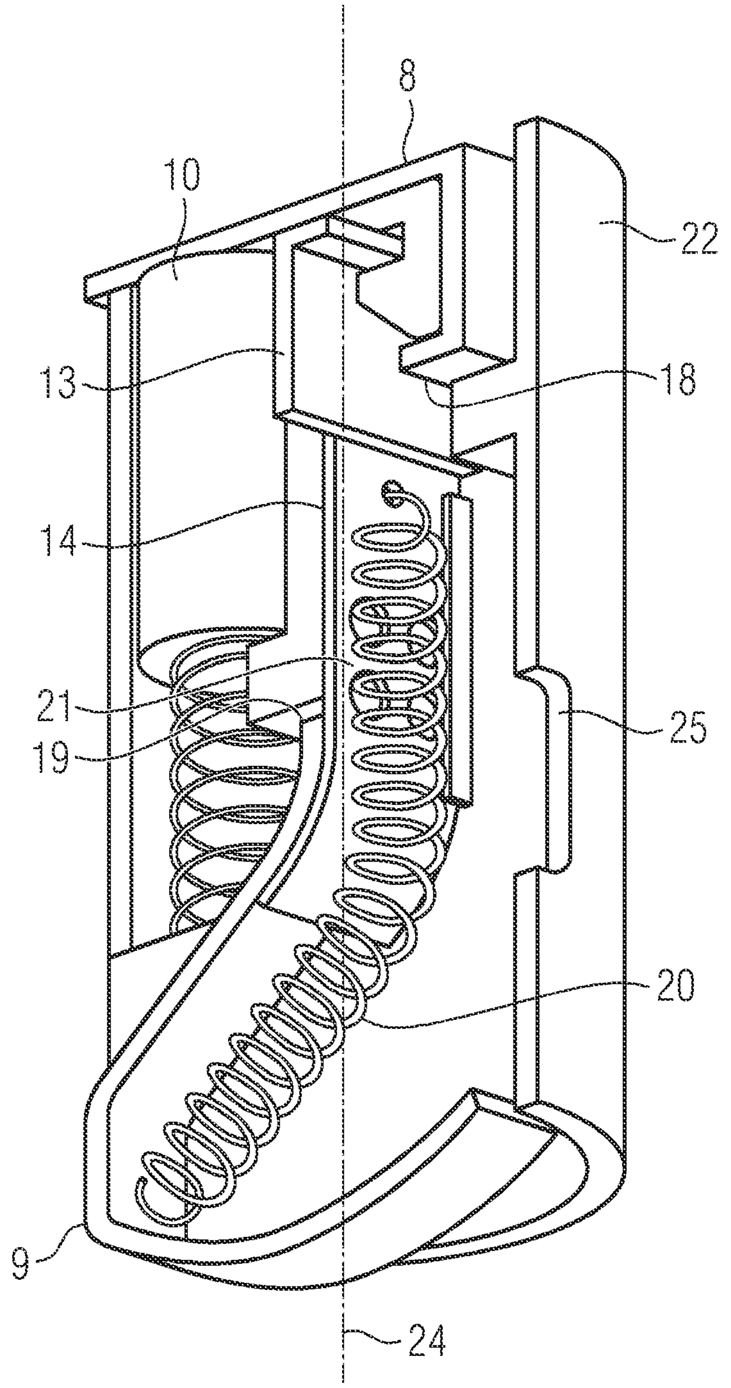
FIG. 5 shows a housing of a variant of embodiment of a disconnecting device, in section.
Figure 6:
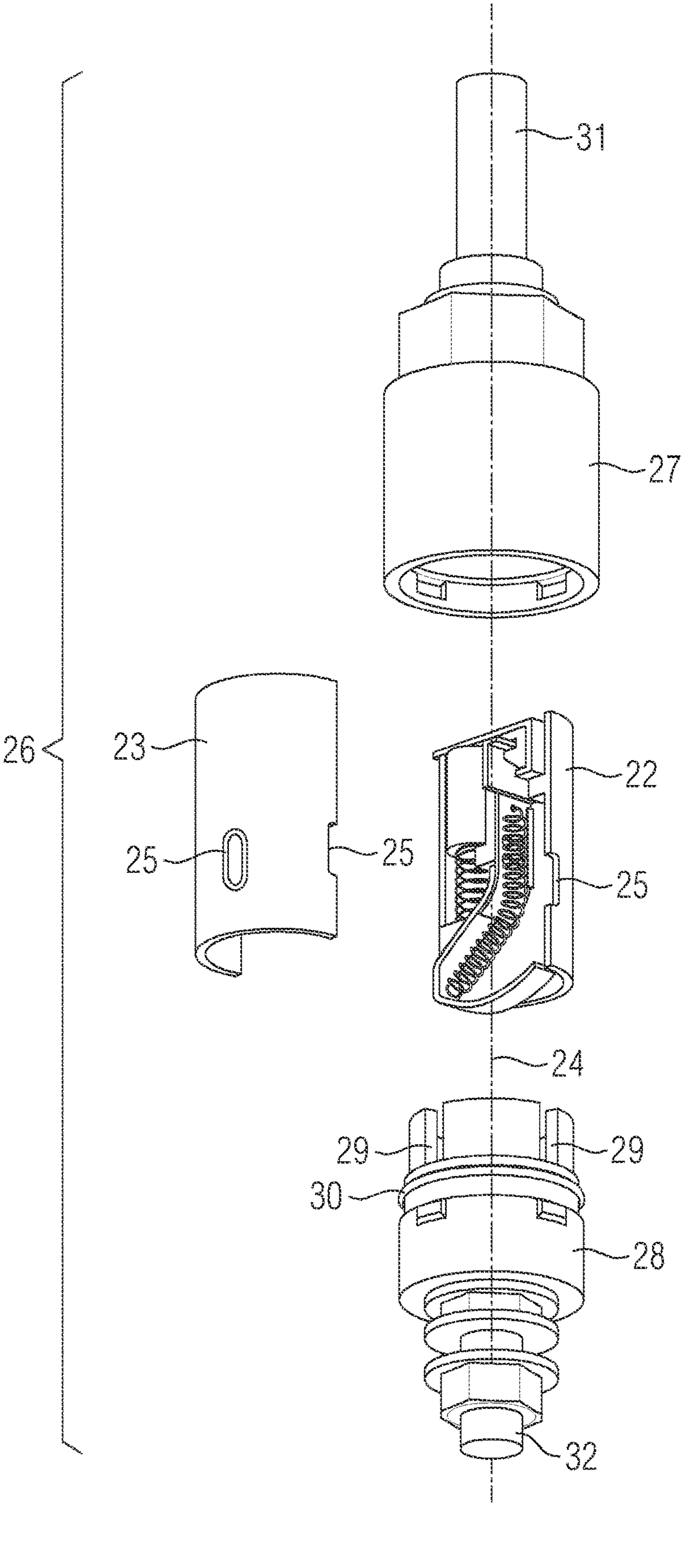
FIG. 6 shows the variant of embodiment of the disconnecting device, in an exploded representation.
Figure 7:
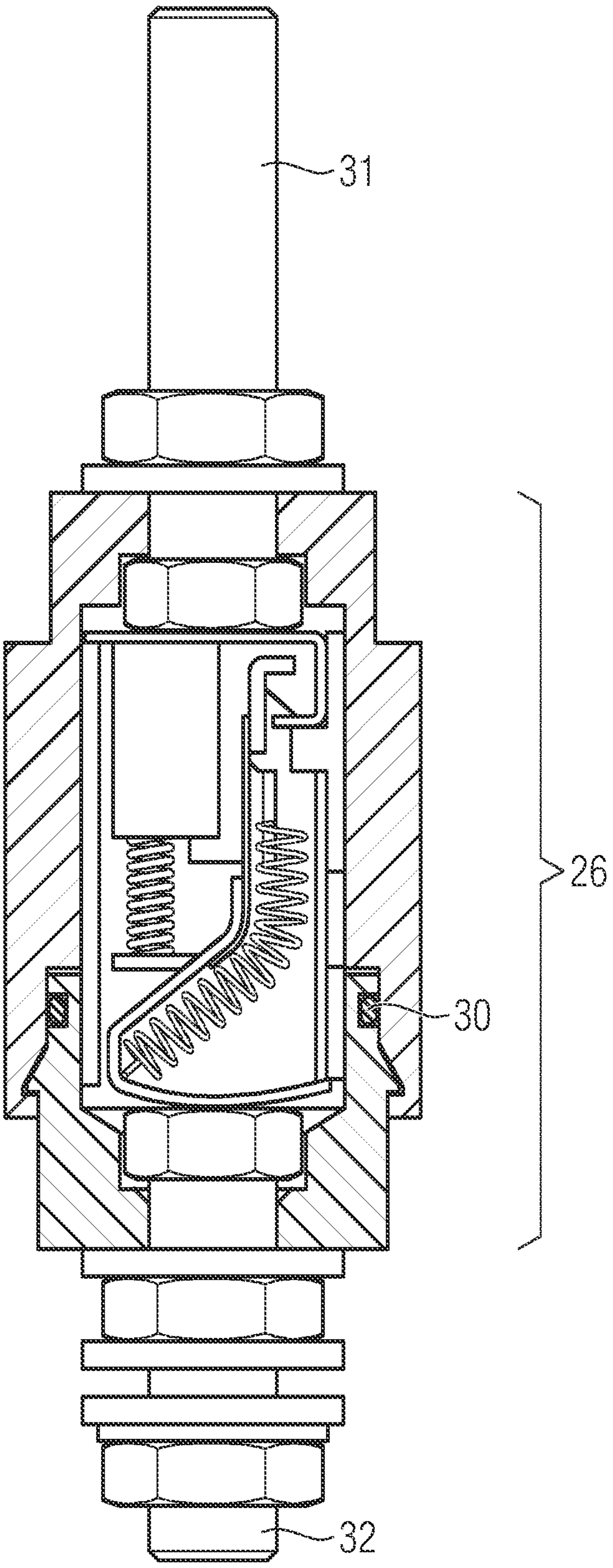
FIG. 7 shows the variant of embodiment of a disconnecting device, in section.

Further to the description of the mode of operation of an assembly having a surge arresting device 2 and the disconnecting device 1, with reference to FIGS. 1, 2, 3 and 4, the layout of the disconnecting device 1 will now be described in greater detail with reference to FIGS. 5, 6 and 7. FIGS. 5, 6 and 7 respectively represent a variant of embodiment of a disconnecting device 1.

Figure 3:
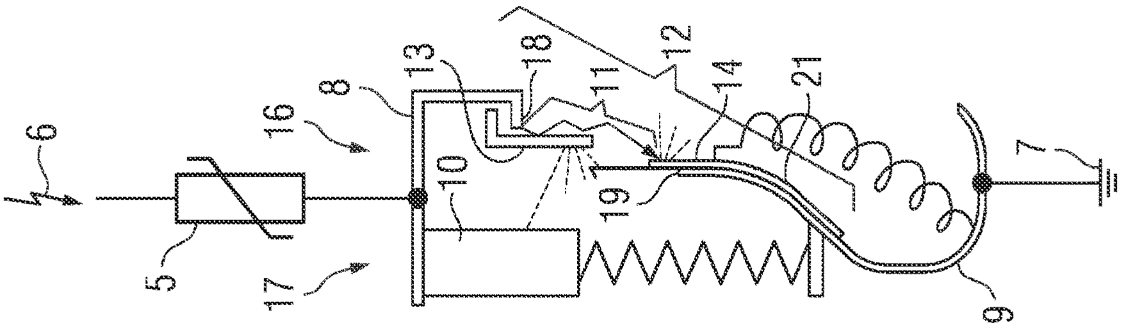
FIG. 3 shows elements of the disconnecting device during tripping.
Figure 2:
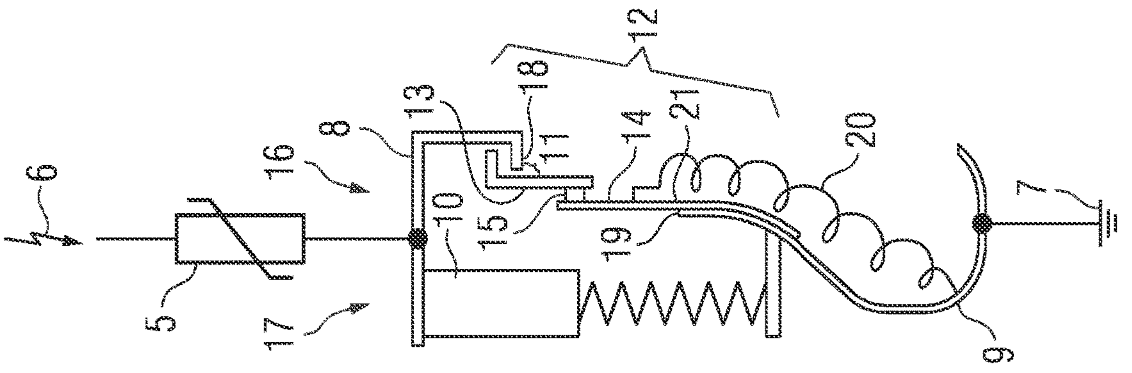
FIG. 2 shows elements of a disconnecting device in a non-tripped state.

Proceeding from the representations according to FIGS. 2, 3 and 4, FIG. 5 shows a perspective view of elements of the disconnecting device 1 represented in FIGS. 2, 3 and 4. FIG. 5 shows a first housing section 22, which is configured in the form of a half-shell. A second housing section 23 (see FIG. 6) is provided in addition to the first housing section 22. The two housing sections 22, 23 are elements of a housing which positions constituent units of the disconnecting device 1 relative to one another. The housing or housing sections 22, 23 are formed of an electrically insulating material, for example plastic. At the end face, the first contact means 8 and the second contact means 9 are inserted in the housing, and are positioned in an angularly rigid arrangement in relation to one another. From FIG. 5, it can be seen that the second contact means 9 comprises an arched compression region, which permits elastic strain and contact-connection in the event of the application of a compression force in the axial direction 24. The impedance element 10 is inserted in a recess, which permits a compression of the impedance element 10 against the first contact means 8. Moreover, a recess is provided to accommodate a compression spring for the application of the compression force to the impedance element 10.

In the axial direction 24, the first arcing root point 18 and a shoulder of the first switching section 13 engage to the rear of one another, with the interposition of an electrically insulating section of the housing. Thus, by means of the spring element 20, a compression of the first switching section 13 against the first arcing root point 18 of the first contact means 8. As can be seen from FIG. 5, the first switching section 13 has an enlarged wall thickness, in comparison with the second switching section 14. Moreover, the first switching section 13 has an enlarged width, in comparison with the second switching section 14. In addition to the overlap of shoulders of the first switching section 13 and the first arcing root point 18, a lateral engagement of the first switching section 13 in the housing, or in the respective housing section 22, 23, is provided. In FIG. 5, it can further be seen that, in the second switching section 14, cut-outs are incorporated in order to form the crumple zone 21. The housing encloses both paths 16, 17 on the shell side, in the form of half-shells. Ducts 25 are provided in shell side of the housing. By means of these ducts 25, the interior space, which is employed for the accommodation of the impedance element 10, the spark gap 11, the thermally actuatable switching element 12, etc., is connected to its environment.

FIG. 6 is based upon the representation according to FIG. 5 wherein, additionally, the second housing section 23 is represented, which is joined to the first housing section 22 in an essentially transverse direction (joining direction) to the axial direction 24. On the grounds of the transverse orientation of the joining direction between the two housing sections 22, 23, it is possible for units are arranged in the interior of the housing to be secured in the axial direction 24 by means of projections.

The housing is enclosed by a jacket 26 (in the exploded representation according to FIG. 6). The jacket comprises a first bushing section 27 and a second bushing section 28. With the two bushing sections 27, 28 in the connected state, the jacket 26 entirely encloses the housing on the shell side. A resulting join gap can be at least partially filled with a friction-reducing means. This means facilities the connection and detachment of the bushing sections 27, 28. Moreover, superior sealing effect can be achieved. As a means of this type, for example, greases or oils can be employed. The two bushing sections 27, 28 are configured with shape-matching overlap sections, such that the two bushing sections 27, 28 can interlock, and can thus surround and enclose the housing, and any paths 16, 17 which are located therein. In order to secure the two bushing sections 27, 28, latching lugs are provided on the second bushing section 28. The latching lugs engage with shape-matching shoulders in the first bushing section 27. On the grounds of the radial distribution of a plurality of latching lugs about the perimeter of the second bushing section 28, security against rotation is provided. Security against rotation can additionally be supported by guide slots 29 and corresponding slot nuts. Moreover, an elastic sealing element 30 is provided, which seals the joint gap between the two bushing sections 27, 28. The sealing element 30 can be lubricated by the application of a friction-reducing means (as described above) such that, firstly, friction is reduced and, secondly, a superior sealing effect is provided.

At mutually averted end faces of the bushing sections 27, 28, the latter are penetrated and terminated by electrically conductive through-connections 31, 32. The electrically conductive through-connections 31, 32 are, for example, threaded bolts having a bolt head wherein, in each case, the bolt heads are oriented in the direction of the first or second contact means 8, 9. Upon the connection of the bushing sections 27, 28 to form a surrounding jacket 26, the housing is enclosed. A joint gap which is present between the jacket 26 and the housing is connected by means of ducts 25 to the interior space of the housing. In the event of the occurrence of an arc within the housing, expanded gas can flow via the ducts 25 into the joint gap. The resulting overpressure therein results in a dilation of the jacket 26 or of the bushing sections 27, 28. A simplified release of the jacket 26 or of the bushing sections 27, 28, in the event of detachment, is thus permitted.

FIG. 7 shows the exemplary embodiment of a disconnecting device 1, represented in section. The two bushing sections 27, 28 are interconnected by means of latching connections. An annular elastic sealing element 30, which is accommodated in a slot, is responsible for the sealing of the bushing sections 27, 28 in relation to one another. By means of the through-connections 31, 32 which extend in the opposing direction (in relation to the axial direction 24), a mechanical and electrical contact-connection of the disconnecting device 1 is permitted. By means of the bolt heads of the through-connections 31, 32, which are located in the interior of the jacket 26, a respective contact-connection is provided by the engagement thereof with the first contact means 8 or with the second contact means 9. By means of the cambered and elastically deformable configuration of the contact surface of the second contact means 29, components which are arranged in the interior of the housing, by means of the contact region of the first contact means 8 or of the second contact means 9, can be elastically tensioned and electrically contact-connected between the through-connections 31, 32.

The invention claimed is:

1. An assembly, comprising:

a disconnecting device for a surge-arresting device, said disconnecting device containing:

a first contact;

a second contact;

a first path disposed between said first contact and said second contact, said first path having a switching element being thermally tripped, wherein a spark gap is disposed in said first path, wherein said switching element has a thermally actuatable rupture joint, a first switching section and a second switching section, said first and said second switching sections are mutually connected in an electrically conductive manner via said thermally actuatable rupture joint; and a second path disposed electrically parallel to said first path and having an impedance element, said second path disposed between said first contact and said second contact.

2. The assembly according to claim 1, further comprising a spring element for applying a pre-tensioning force, said spring element compresses said second switching section against said second contact.

3. The assembly according to claim 1, wherein the pre-tensioning force acts on at least one of said first or said second switching section in a parallel direction to an axis which runs from said first contact to said second contact.

4. The assembly according to claim 2, wherein said first switching section is compressed by said spring element against said first contact, with an interposition of an insulating section.

5. The assembly according to claim 1, further comprising a housing having a first housing section and a second housing section, in said housing said first contact, said second contact and said switching element are accommodated, wherein a joint axis between said first housing section and said second housing section is generally oriented transversely to an axis running from said first contact to said second contact.

6. The assembly according to claim 5, further comprising a jacket enclosing said housing, said jacket secures said first and said second housing sections relative to one another.

7. The assembly according to claim 6, wherein said jacket surrounds said housing in a manner of a bushing, said jacket has a first bushing section connected to a second bushing section in a plug-in configuration.

8. The assembly according to claim 6, wherein said housing has at least one channel and delimits an interior space which is connected by means of said at least one channel to a joint gap which is disposed between said housing and said jacket.

9. The assembly according to claim 7, wherein:

said first bushing section has an electrically conductive through-connection, which is connected to said first contact in an electrically conductive manner; and said second bushing section has an electrically conductive through-connection, which is connected to said second contact in an electrically conductive manner.

10. The assembly according to claim 1, wherein said first switching section assumes a greater wall thickness than said second switching section.

11. The assembly according to claim 1, wherein said first switching section has a greater width than said second switching section.

12. The assembly according to claim 1, wherein said second switching section has a crumple zone.

13. The assembly according to claim 1, wherein said second contact has an arcing root point.

14. The assembly according to claim 1, wherein:

said first contact is connected to the surge-arresting device in an electrically conductive manner; or said second contact is connected to the surge-arresting device in an electrically conductive manner.

15. The assembly according to claim 1, wherein:

said second contact is energized with a ground potential; or said first contact is energized with the ground potential.

16. The assembly according to claim 12, wherein said crumple zone is a perforated zone.

17. The assembly according to claim 14, wherein:

said first contact is carried by the surge-arresting device; or said second contact is carried by the surge-arresting device.

* * * * *